United States Patent [19]

Muller

[11] Patent Number: 4,572,792

[45] Date of Patent: Feb. 25, 1986

[54] STRIPPER COMPOSITION FOR A PAINT HAVING A POLYSULFIDE BASECOAT

[75] Inventor: Jacobus L. Muller, Whittier, Calif.

[73] Assignee: McGean-Rohco, Inc., Cleveland, Ohio

[21] Appl. No.: 614,990

[22] Filed: May 29, 1984

[51] Int. Cl.$^4$ .............................................. C11D 7/30
[52] U.S. Cl. ..................................... 252/171; 252/158; 252/170; 252/172; 252/174.16; 252/DIG. 8; 252/DIG. 17; 252/162; 134/2; 134/38
[58] Field of Search ...................... 252/89.1, 158, 162, 252/170, 171, 174.16, DIG. 8, DIG. 17; 134/2, 38

[56] References Cited

U.S. PATENT DOCUMENTS

| | | | |
|---|---|---|---|
| 3,015,825 | 10/1971 | Gansser | 252/DIG. 8 |
| 3,743,542 | 7/1973 | Cooper et al. | 252/DIG. 8 |
| 3,983,047 | 9/1976 | Vinson | 252/DIG. 8 |
| 4,278,557 | 7/1981 | Elwell, Jr. | 252/DIG. 8 |
| 4,396,436 | 8/1983 | Laemmle et al. | 252/171 |

Primary Examiner—Paul Lieberman
Assistant Examiner—Hoa Van Le
Attorney, Agent, or Firm—Fay, Sharpe, Fagan, Minnich & McKee

[57] ABSTRACT

A composition is provided which is especially adapted for use in stripping a polysulfide basecoat (sealant) from a surface. The composition comprises, as essential ingredients, a chlorinated solvent and an effective amount of at least one activator selected from the group consisting of lower alkyl phosphite and aryl phosphine.

A method of stripping or removing a polysulfide basecoat (sealant) from a surface is also provided. The polysulfide basecoat may have associated therewith a polyurethane topcoat.

15 Claims, No Drawings

STRIPPER COMPOSITION FOR A PAINT HAVING A POLYSULFIDE BASECOAT

BACKGROUND OF THE INVENTION

The present invention relates to a composition for removing a polysulfide coating (sealant) from a metallic surface. More particularly, the instant invention concerns a composition adapted for use in stripping or removing a polysulfide basecoat from a metallic surface which composition comprises a chlorinated solvent and at least one activator selected from the group consisting of lower alkyl phosphite and aryl phosphine. The polysulfide basecoat may have associated therewith a polyurethane topcoat.

For sometime now, it has become a practice to use a polysulfide sealant material as a corrosion resistant basecoat for paint systems on numerous types of aircraft. Because of its resiliency, paints containing such a sealant have greatly improved the corrosion resistance of metallic parts and components. In practice, the complete finish may include a polyurethane topcoat with or without an epoxy primer between the urethane and polysulfide. Removing paint from an aircraft on a periodic basis is required for inspection and maintenance. Removal of a paint system having a polysulfide basecoat is a very difficult task. Prior to the instant invention, it has been necessary to spend a great deal of time and effort scraping, brushing and sanding to remove such a basecoat. This is time consuming and can result in excessive damage to aircraft skins. As a result, the polysulfide basecoat may not be completely removed from many of the aircraft currently being overhauled and this interferes with proper inspection procedures.

One commonly employed system for removing polysulfide coatings from a metallic surface utilizes various mercaptans. However, while this system performs adequately with respect to the physical removal of the polysulfide coating, it suffers from certain undesirable side effects. For example such systems are generally corrosive to aircraft metals, particularly cadmium plated steel which is is used extensively on jet aircraft. In addition, because of the corrosiveness with respect to cadmium plated high strength steel, such systems often cause severe hydrogen embrittlement. Another problem associated with mercaptan usage is that such compounds exhibit a very offensive odor. From an economic standpoint, these systems suffer due to their poor shelf life. Another serious problem associated with mercaptan containing systems is that the ingredients cause severe pollution problems.

Accordingly, it is the principal object of this invention to provide a composition and method for removing or stripping a polysulfide basecoating, which may be overcoated with a topcoating of urethane, from a metallic surface or substrate while avoiding or at least minimizing the problems associated with prior art expedients for removing such coatings.

These and other objects of the instant invention will become apparent to those skilled in the art from a reading of the following specification and claims.

SUMMARY OF THE INVENTION

In one aspect, the present invention concerns a composition adapted for use in stripping a polysulfide basecoat from a hard surface which composition comprises a chlorinated solvent and at least one activator selected from the group consisting of lower alkyl phosphite and aryl phosphine.

In another aspect, the present invention relates to a method for removing a surface coating containing a polysulfide material from a substrate which comprises coating the substrate with a composition which comprises a chlorinated solvent and at least one activator selected from the group consisting of lower alkyl phosphite and aryl phosphine.

DESCRIPTION OF THE PREFERRED EMBODIMENTS OF THE INVENTION

The heart or crux of the instant invention resides in the discovery that certain organic phosphorus compounds are very active in removing polysulfide basecoats and that when used in combination with a chlorinated solvent enable one to remove the entire aircraft paint system in an efficient and effective manner.

More particularly, the paint stripper composition of the present invention comprises a paint film softening chlorinated solvent compound and an activator selected from the group consisting of lower alkyl phosphites and aryl phosphine.

The chlorinated solvent compound is preferably selected from the group consisting of methylene chloride, 1,1,1-trichloroethane, perchloroethylene, orthodichlorobenzene and mixtures thereof. However, other chlorinated solvents may be employed in the practice of the invention, provided that they do not adversely effect the functioning of the phosphite or phosphine compound which is used in combination therewith. The composition of the invention contains at least about ten percent by chlorinated solvent.

The activator used in the practice of the invention is a compound having the structural formula

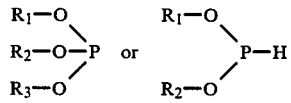

wherein $R_1$, $R_2$ and $R_3$ are the same or different alkyl groups and each contain from one to eight carbon atoms, and $(R_4)_3P$ wherein $R_4$ is

or

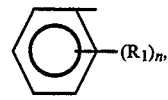

with $n = 1$ to 8. Preferably, $R_1$, $R_2$ and $R_3$ are ethyl and/or isopropyl and $R_4$ has a monocyclic aromatic nucleous with or without lower alkyl side chains. The activator is present in the composition of the invention in percent by weight ranging from about 0.1 percent to about 20 percent. The preferred range is from about 1 percent to about 8 percent.

In addition, the following listed ingredients may be present in the composition of the instant invention.

Cosolvents can be used to enhance the stripping composition's properties such as thickening and flow characteristics. They are not necessary for performance with respect to polysulfide, but some alcohols improve performance with respect to polyurethane paints. Although not critical, $C_2$ alcohols are most desirable. Cosolvents are typically utilized in amounts ranging from about 0.5 percent by weight to about 20.0 percent by weight.

To reduce evaporation, retardants such as petroleum paraffins (preferably having a melting point in the range of 102°-165° F.) can be utilized. Such retardants are preferably used in amounts ranging from about 0.1 weight percent to about 5.0 weight percent.

To protect certain metals, such as magnesium and high strength steel, an alkalinity agent can be utilized. Such an agent is also desirable for stability of the phosphite. Such alkalinity agents include alkali metal hydroxides (sodium, lithium and potassium), ammonia and trialkyl amines, including alkanol amines wherein the alkyl group contains 1 to about 10 carbon atoms, with the preferred number of carbon atoms ranging from 4 to 8. Alkaline earth alkoxides, such as $NaOCH_3$ or $NaOC_2H_5$ are also effective as alkalinity agents. In practice, such agents are utilized in an amount ranging from about 0.1 weight percent to about 10 weight percent.

Surfactants can be employed to increase the wetting characteristics of the composition of the invention. Typically, useful surfactants include alkyl aryl sulfonates (preferably $C_8$-$C_{14}$) and alkyl phosphate esters. The specific surfactant utilized is not critical and various known surfactants can be employed. Typically, surfactants are employed in an amount ranging from about 0.1 weight percent to about 10.0 weight percent.

Cellulosic thickeners such as Methocel (a product of Dow Chem. Co.) and Klucel (a product of Hercules Corp.) are often employed in the stripper composition of the present invention. However, Methocels will usually require alcohol cosolvents. Klucel, on the other hand, is less dependent on cosolvents. Hydrophobic treated clays can be utilized in conjunction with a small amount of cellulosic thickener. In practice, such thickeners are employed in an amount ranging from about 0.2 weight percent to about 5.0 weight percent.

Various inhibitors can be utilized in combination with certain surfactants. For example, inhibitors such as (a) toluene triazole (at up to 0.6 weight percent) or (b) a calcium, magnesium or barium salt of the anionic surfactant or a mixture thereof or (c) tertiary amines and other film forming inhibitors which react with surfactant to form an alkaline comound can be employed. The choice of surfactant is important in determining which inhibitor is to be utilized. In practice, such inhibitors are generally utilized in an amount ranging from about 0.01 weight percent to about 4.0 weight percent.

The invention will be more fully understood from the following examples:

EXAMPLE I

A stripper composition of the instant invention was made according to the following formula: 83 weight percent methylene chloride, 4.4 weight percent toluene, 1.3 weight percent paraffin wax (melting point 125° F.), and 11.0 weight percent triethylphosphite. These individual ingredients were mixed together and were stirred until solution was complete. Subsequently, the resultant composition was applied to a metallic test panel having a primer (basecoat) of polysulfide and polyurethane topcoat. The two coat system rapidly disintegrated and was readily removed from the test panel.

EXAMPLE II

A stripper composition identical to that of Example I was produced, except that the triethylphosphite was replaced with 11 weight percent of triisopropylphosphite. When applied to a test panel as in Example I, the coating likewise rapidly disintegrated and was readily removed therefrom.

EXAMPLE III

A stripper composition of a somewhat more complex formula was prepared containing the following ingredients: 83 weight percent methylene chloride, 3.3 weight percent toluene, 1.3 weight percent paraffin (125° F. melting point), 10.4 weight percent methanol, 1.0 weight percent methocel (grade F4M) and 5.2 weight percent isopropyl phosphite. The pH of the composition was adjusted with ammonia to render it basic. This formula stripped a test panel, of the type described in Example I, very well.

The phosphites hydrolyze with relative ease and it is, therefore, necessary to minimize their contact with water. The ingredients which are chosen for the stripper composition must, therefore, be as dry as possible and the mixing process must be controlled to avoid the undesirable pickup of moisture.

The shelf life of phosphite activated stripper composition is increased if the alkalinity of the mixture in general is maintained. Ammonia is especially useful when used with a small amount of sodium or potassium hydroxide. The potassium hydroxide is important to maintain a marginal alkalinity after long exposure of the product to drying conditions during which the ammonia evaporates. Other phosphite compounds which demonstrated activity with respect to polysulfide coatings were tributylphosphite, tris(2-ethylhexyl) phosphite, triisooctyl phosphite, trimethylphosphite and diethyl hydrogen phosphite. Triphenylphosphine was nearly as active as the most effective of the phosphites.

As a cosolvent, ethanol is the alcohol of choice although its water content must be carefully monitored and minimized. A stripper formulated with isopropanol and triisopropylphosphite stripped a test panel and exhibited very little odor.

Anatara LM400 (ethyoxylated dinonyl phosphate ester) (a product of GAF) is an excellent choice as a surfactant. Calcium oxide or barium oxide my be added to increase protective film forming. Toluene triazole and tributylamine are excellent inhibitors.

EXAMPLE IV

A stripper composition illustrating the proportions of these various ingredients is as follows: 4 weight percent triethylphosphite activator, 0.5 weight percent toluene triazole inhibitor, 3 weight percent paraffin as retardant, 1.2 weight percent methanol, 2.9 weight percent surfactant, 0.15 weight percent potassium hydroxide, 6 weight percent ethanol, and 0.35 weight percent anhydrous ammonia. This formula exhibited excellent shelf life and stripping activity when applied to a panel containing three coats of a sealing and coating polysulfide primer, one coat of an epoxy polymid primer and a topcoat of an aliphatic isocyanate urethane.

From the foregoing it is clear that the instant invention provides a unique method and composition for stripping or removing a polysulfide basecoat which is overlayed with polyurethane. However, it should be noted that the composition of the instant invention can be used to strip various other types of paints or basecoats, such as latex base paints and the like.

While there have been described herein what are at present considered to be the preferred embodiments of this invention, it will be apparent to those skilled in the art that various changes and modifications may be made therein without departing from the invention, and it is, therefore, intended in the appended claims to cover all such changes and modifications as fall within the true spirit and scope of the invention.

What is claimed is:

1. A paint stripper composition adapted for use in stripping a basecoat from a surface which comprises at least 10 weight percent of a chlorinated solvent selected from the group consisting of methylene chloride, 1,1,1-trichloroethane, perchloroethylene, orthodichlorobenzene and mixtures thereof and from about 0.1 to about 20.0 weight percent of at least one activator selected from the group consisting of lower alkyl phosphite and aryl phosphine, with said activator having the formula

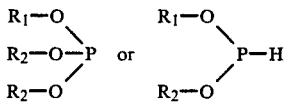

wherein $R_1$, $R_2$ and $R_3$ are the same or different alkyl groups and each contains from one to eight carbon atoms, and $(R_4)_3P$ wherein $R_4$ is

or

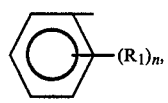

with n=1 to 8.

2. The paint stripper composition of claim 1 wherein said activator is present in an amount ranging from about 1.0 weight percent to about 8 weight percent.

3. The paint stripper of claim 1 which includes a lower alkyl alcohol as a cosolvent.

4. The paint stripper composition of claim 3 wherein said cosolvent is present in the amount from about 0.5 weight percent to about 20 weight percent of said composition.

5. The paint stripper composition of claim 1 which includes from about 0.1 weight percent to about 5 weight percent of an evaporation retardant comprising paraffin having a melting point ranging from about 102° to about 165° F.

6. The paint stripper composition of claim 1 which includes from about 0.1 weight percent to about 10% of an alkalinity agent.

7. The paint stripper composition of claim 6 wherein said alkalinity agent is selected from the group consisting of alkali metal hydroxides, ammonia, trialkylamines wherein the alkyl group is selected from $C_1$ to $C_{10}$, and mixtures thereof.

8. The paint stripper composition of claim 7 which includes from about 0.1 weight percent to about 10 weight percent of a surfactant.

9. The paint stripper composition of claim 8 wherein said surfactant is an alkylaryl sulfonate having $C_8$ to $C_{14}$ alkyl groups or an alkyl phosphate ester.

10. A method for removing a surface coating of a polysulfide containing material from a substrate which comprises contacting said coating with a composition which comprises at least 10 weight percent of a chlorinated solvent selected from the group of methylene chloride, 1,1,1-trichloroethane, perchloroethylene, orthodichlorobenzene and mixture thereof and from about 0.1 to about 20.0 percent of at least one activator selected from the group consisting of lower alkyl phosphite and aryl phosphine.

11. The method of claim 10 wherein said activator is selected from the group having the formula

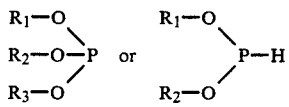

wherein $R_1$, and $R_2$ and $R_3$ are the same or different alkyl groups and contains from one to eight carbon atoms, and $(R_4)_3P$ wherein $R_4$ is

or

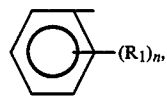

with n=1 to 8.

12. The method of claim 11 wherein $R_1$, $R_2$ and $R_3$ are selected from the group consisting of ethyl, isopropyl and mixtures thereof.

13. The method of claim 10 wherein said activator is present in the amount of at least 0.1 weight percent of said composition.

14. The method of claim 10 wherein said activator is present in an amount ranging from about 0.1 weight percent to about 20 weight percent.

15. The method of claim 14 wherein said activator is present in an amount ranging from about 1.0 weight percent to about 8 weight percent.

* * * * *